Oct. 10, 1933.  L. F. JULIEN  1,929,695
METHOD OF FORMING METAL BARS FOR SCREEN FRAMES
Filed July 21, 1931   2 Sheets-Sheet 1
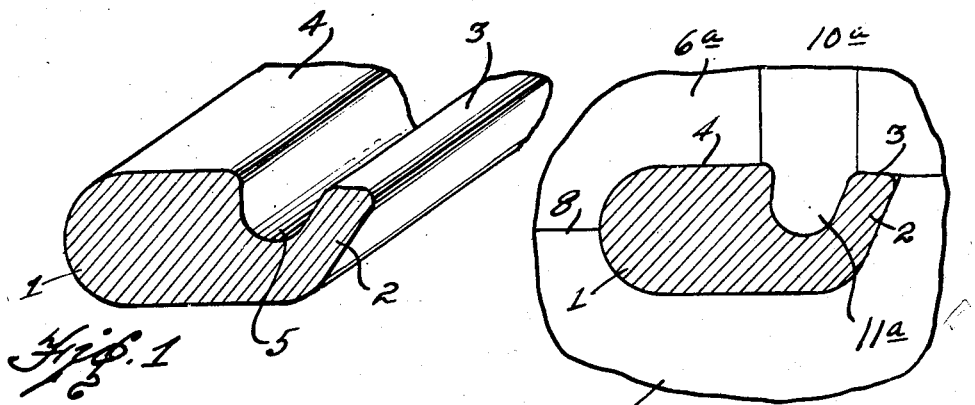
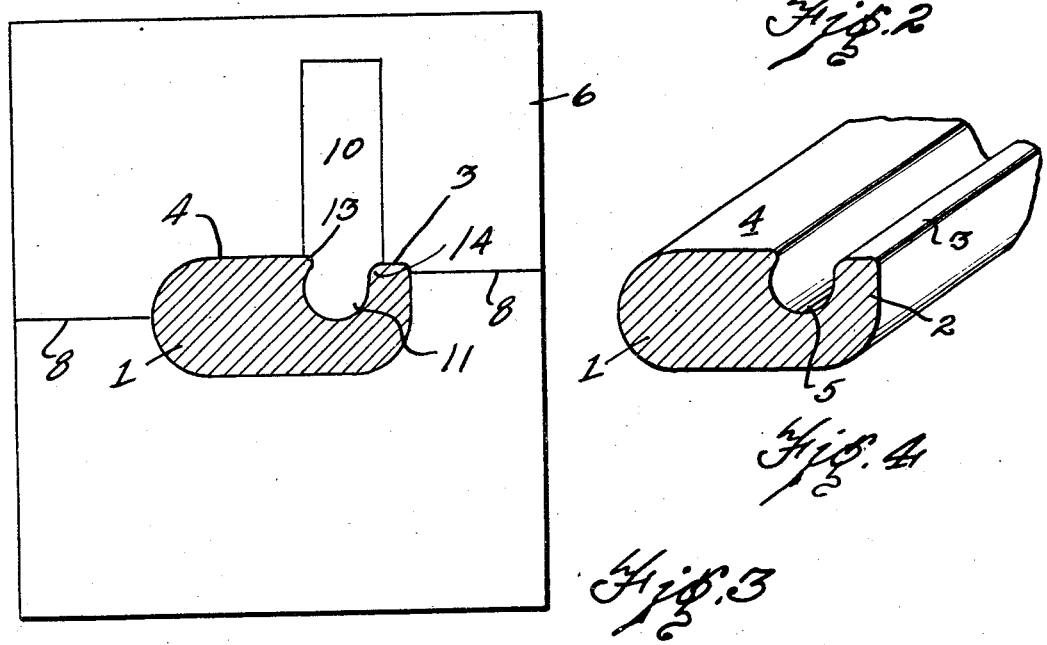
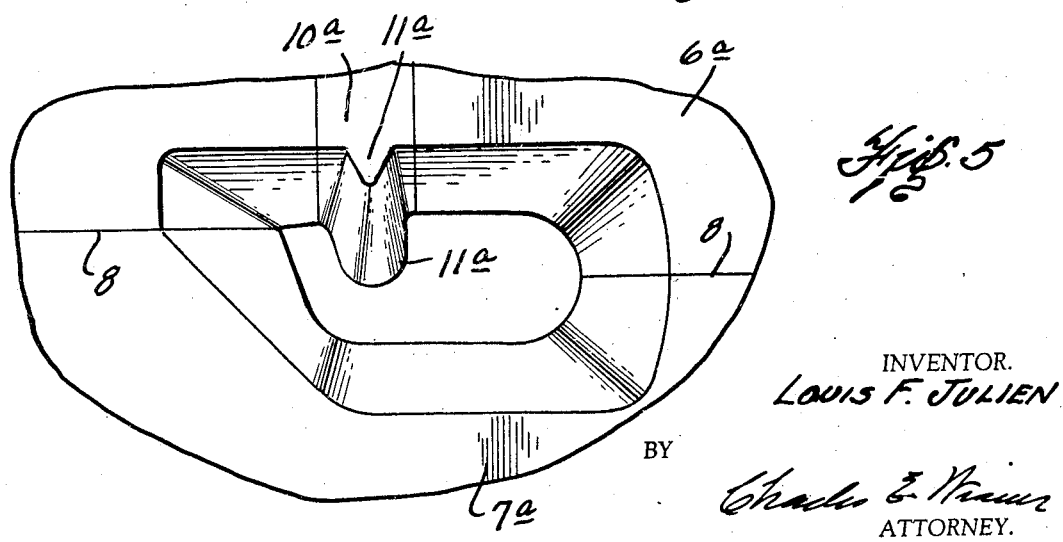
INVENTOR.
LOUIS F. JULIEN
BY
ATTORNEY.

Oct. 10, 1933.　　　　L. F. JULIEN　　　　1,929,695

METHOD OF FORMING METAL BARS FOR SCREEN FRAMES

Filed July 21, 1931　　　　2 Sheets-Sheet 2

INVENTOR.
LOUIS F. JULIEN
BY
　　　　ATTORNEY.

Patented Oct. 10, 1933

1,929,695

UNITED STATES PATENT OFFICE 1,929,695

METHOD OF FORMING METAL BARS FOR SCREEN FRAMES

Louis F. Julien, Detroit, Mich., assignor to Chamberlin Metal Weather Strip Company, Detroit, Mich., a corporation of Michigan Application July 21, 1931. Serial No. 552,240

5 Claims. (Cl. 29—148)

This invention relates to a method of forming metal bars for screen frames.

The method is particularly applicable in the formation of bars of solid stock of iron or mild steel for use in the manufacture of the screen frames in which a rod or wire is forced into the groove to hold the edge of the screen fabric. Bars of this type have heretofore been made of aluminum or other semi-plastic material that is shaped by what is known as the "extrusion" method, sometimes known as "Lee's Process", in which the metal is pushed through a die of proper shape to cause the metal to assume the desired form. Such a method, however, is confined to a comparatively soft or semi-plastic metal and is not applicable to iron or mild steel and when such comparatively soft metal has been used in the manufacture of screen frames for instance, the frames are easily bent or the frame caused to take an "out of true" shape by accidental dropping or striking the same against objects in the handling.

My process is particularly adaptable in the manufacture of bars for screen frames of a solid bar of mild steel that heretofore has been impossible to shape cheaply with the desired form of groove. It has also been the practice to form bars for this purpose of sheet metal which can be readily stamped to shape but such sheet metal tubular bars have the fault of not providing sufficient metal and joints that are to be soldered or welded and therefore more or less readily become severed at the joint through rough handling as well as being too large in cross section for neatness of appearance when applied to a window sash and also are more or less readily bent out of shape.

By my improved process a bar of the desired shape in cross section may be formed from a solid bar of the desired shape in cross section and may be formed from a solid bar of iron or steel through first rolling the bar to secure a lip at one edge thereof and then shaping the bar as well as bending the lip by drawing the same through a die or successive dies to gradually force the lip and the stock of the bar to provide a channel of less width at the throat or opening at the surface of the bar and of greater width therebelow.

There are several additional features involved in my improved method as is hereinafter more fully described and set forth in the appended claims, and the preferred method and means by which the method may be performed are hereinafter more fully described and shown more or less diagrammatically in the accompanying drawings in which—

Fig. 1 shows a section of a bar in perspective as formed by the rolling process.

Fig. 2 is a section partially in elevation showing the bar as it passes from the die in the first step of the drawing operation following the rolling process.

Fig. 3 is a section similar to Fig. 2 showing the bar of stock as it passes from the delivery end of the second or finishing die.

Fig. 4 is a perspective view of a section of the completed bar.

Fig. 5 is an elevation showing the form of the first die at the entrance end.

Figure 6:
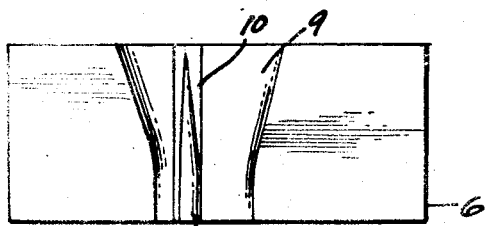
Fig. 6 is a plan view of the upper half of the second die.

It is first to be understood that the well known rolling process is utilized to produce the shape of the bar shown in Fig. 1, the body 1 of which is rounded at the one side and formed with an upstanding inclined lip 2 at the other side, the upper face 3 of which is below the upper face 4 of the bar and the groove 5 in the upper face is formed in passing through the rolls. Subsequent to this rolling step of the process the bar is cold drawn through dies. There are two sets of dies but both are similar in general construction and detailed description of one only will be given.

The second die consists of an upper block 6 and a lower block 7. An insert 10 is set into the upper block and extends into the die recess between the two blocks as is illustrated in Fig. 8. The depending portion or rib 11 of the insert varies in form from the entrance to the delivery end of the die as will be understood from Figs. 8 and 9 and the die illustrated in Fig. 7 is the second or finishing set of dies through which the bar is finally passed.

Figure 7:
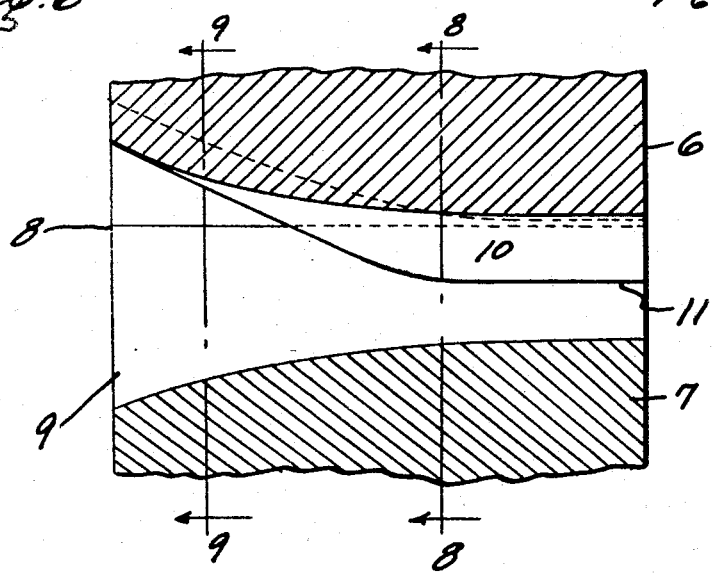
Fig. 7 is a vertical section taken through the second die on line 7—7 of Fig. 8.
Figures 8, 9:
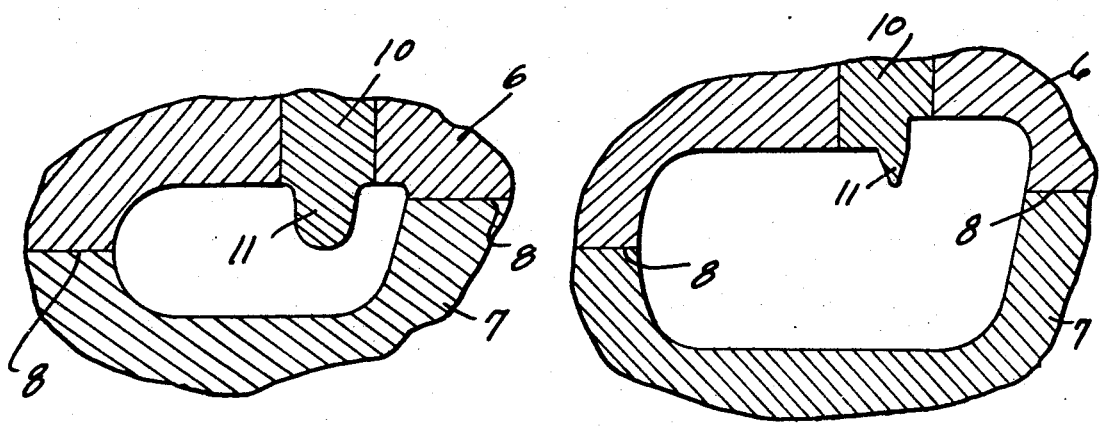
Fig. 8 is a cross section taken on line 8—8 of Fig. 7.
Fig. 9 is a cross section taken on line 9—9 of Fig. 7.

An elevation of the delivery end of the second die of Fig. 7 is shown in Fig. 3 in which the final form of the bar is provided by the shape of the depending rib 11. The first die is similar in all general respects consisting of the parts 6a and 7a shown in Fig. 2 with an insert 10a and a depending rib 11a as shown in Fig. 2, which is the delivery end of the first die and by which the lip 2 of the bar is turned from the angular relationship shown in Fig. 1 toward the vertical as shown in Fig. 2. The entrance end of the first die is shown in Fig. 5. It is to be noted that, in Fig. 2, at the finish of the first pass the throat of the groove is still wider than the distance between the sides of the groove therebelow, as it is necessary that this groove have a less width of throat than the distance between the sides of the groove therebelow, the second die has a depending rib 11 of a circular contour and the metal of the face 4 of the bar is forced inwardly at the point 13, one purpose being to cause pressure on the one side of the rib 11 equal to that on the opposite side as at 14 for forming the opposing edge of the throat thus equalizing the strains and liability of fracturing the lip is avoided and a throat of the desired width is secured.

The two die sections are each provided with a complemental recess conforming to the desired shape of the bar and the die sections abut on the line 8, 8.

Figure 10:
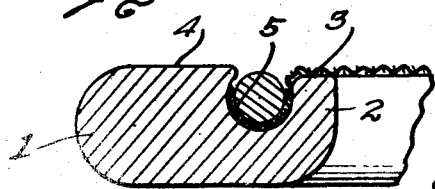
Fig. 10 is a section of the finished bar showing the application of the screen and the locking rod thereto.

The entrance end of the first die is shown in Fig. 5 in which it will be seen that the depending rib 11a is considerably smaller at the entrance end and of different shape than at the delivery end. Thus, in drawing the bar of Fig. 1 into the entrance end of the die shown in Fig. 5, the rib 11a rides into the groove and gradually shapes the groove and adjacent portions of the bar to cause the same to take the form shown in section in Fig. 2. The second die, illustrated in Figs. 3, 6 and 9, inclusive, is of the same character of construction and completes the shape of the bar as shown in section in Figs. 3 and 4. It is also to be noted that the upper edge 3 of the lip of the bar is below the upper surface 4 of the bar. Thus, when the screen member and retaining rod is inserted in the groove, as indicated in Fig. 10, the surface of the screen fabric is practically in the same plane as the surface 4 of the bar.

Iron or steel is difficult to form and thus in metals of this character preferably two passes are made through drawing dies to secure the desired final shape. With the softer metals, it is possible to use a single pass to finally form the die. In either case, however, the process, as will be observed from the foregoing avoids the forming of the bar by machining and the bars may be made in long lengths with readiness and inexpensively formed in comparison to previous methods such as the cutting operations heretofore in use.

From the foregoing it will be evident that the process consists in first rolling a bar to approximately greater width at the throat than below the throat and then by successive passes through dies to shape the bar to provide a groove of less width at the throat than the distance between the sides thereof below the throat and in such final steps to utilize a depending rib to ride the groove of a shape in cross section to determine the form of a groove of the desired shape in cross section, as for instance to receive a round rod for binding a screen fabric in place and in such final steps to utilize the die of such form that the depending rib is supported by equal pressures upon opposite sides prevent fracture.

Having thus briefly described my invention, what I claim and desire to secure by Letters Patent of the United States is—

1. The method of forming metal bars of iron, steel or like material with a groove in its surface having a throat of less width than the distance between the sides of the groove below the throat, which consists in passing the bar between rolls of the necessary form to provide a groove adjacent one edge having a throat of greater width than the distance between the sides of the groove therebelow and thereafter passing the same through a die having a rib to ride in the groove of a shape in cross section at successive points of its length from the entrance end of the die to the delivery end thereof to cause the metal of the bar to be reshaped in practically equal pressure contact with opposite sides of the rib to form a groove having a narrow throat and a shape determined by the shape of the rib in cross section at the delivery end of the die.

2. The method of forming a metal bar of iron with a groove in its surface having a throat of less width than the distance between sides of the groove below the throat, which consists in rolling the bar with a lip at one edge lying at an angle to the side face of the bar and providing a groove between the edge of the lip and the body of the bar of greater width at the throat than the distance between the sides thereof below the throat, then passing the same through dies having a rib riding the groove and a shape in cross section from the entrance end to the delivery end of the die to engage the opposite side walls of the groove under pressure and to gradually turn the lip toward the body of the bar to shape the groove with a throat of less width than the distance between sides of the groove below the throat.

3. The method of forming a solid bar of iron with a groove in its surface having a throat of less width than the distance between the sides thereof below the throat, which consists in first rolling a solid bar of stock to provide an upwardly inclined lip at one edge thereof spaced from the body by a groove in one face, the throat of which is less in width than the distance between the sides of the groove below the throat, and then passing the same through successive dies each of which is provided with a rib to ride the groove, the first die having a shape at one side of the rib to turn the lip against the rib, said rib on the opposite side being supported by contact with the body, and the second die having a rib of a form in cross section corresponding to the desired cross section of the finished groove and having a shape to cause the metal of the bar to be forced toward the lip as the lip is forced toward the bar to support the rib at approximately equal pressure upon opposite sides as the bar is drawn therethrough.

4. The method of forming a bar of iron or steel with a groove in its surface having a throat less in width than the distance between the sides of the groove below the throat which consists in first partially shaping the bar by a rolling process to thereby provide a groove of greatest width at the throat, and then passing the same through successive dies having a rib riding in pressure contact with the surface of the metal forming the groove and of a shape in cross section to reshape the metal of the bar to finally provide a groove with a throat less in width than the distance between the sides thereof below the throat.

5. The method of forming a solid bar of iron or steel with a groove in its surface having a throat less in width than the distance between the sides of the groove below the throat, which consists in first rolling the metal while hot to provide a flange at one edge upwardly and outwardly inclined and separated from the body on one side by a groove, the sides of which lie at an angle one to the other providing a throat of greater width than the distance between the sides of the groove below the throat, and then when cold drawing the bar through dies having a rib riding the groove and of a shape to cause the lip to be gradually turned toward the body of the bar and with the upper edge of the lip below the upper surface of the body of the bar and also to cause the metal of the body of the bar to be forced toward the said lip whereby the rib is engaged by the metal under approximately equal pressure upon opposite sides and a groove is formed with a throat of less width than the distance between the sides thereof below the throat.

LOUIS F. JULIEN.